US005229792A

United States Patent [19]

Ono et al.

[11] Patent Number: 5,229,792

[45] Date of Patent: Jul. 20, 1993

[54] IMAGE COMMUNICATION APPARATUS

[75] Inventors: Takeshi Ono; Fumihiko Watanabe, both of Yokohama, Japan

[73] Assignee: Canon Kabushiki Kaisha, Tokyo, Japan

[21] Appl. No.: 531,590

[22] Filed: Jun. 1, 1990

[30] Foreign Application Priority Data

Jun. 2, 1989 [JP] Japan .................................... 1-139317

[51] Int. Cl.5 .......................... B41J 2/05; B41J 2/165; H04N 1/034

[52] U.S. Cl. ................................ 346/140 R; 358/296; 358/438

[58] Field of Search .................... 346/140 R; 358/296, 358/400, 401, 405–408, 438, 439

[56] References Cited

U.S. PATENT DOCUMENTS

| | | | |
|---|---|---|---|
| 4,123,761 | 10/1978 | Kimura et al. | 346/140 R |
| 4,333,088 | 6/1982 | Diggins | 346/140 R |
| 4,376,283 | 3/1983 | Bower | 346/140 R |
| 4,558,332 | 12/1985 | Takahashi | 346/140 R |
| 4,712,172 | 12/1987 | Kiyohara et al. | 346/140 R X |
| 4,839,737 | 6/1989 | Saito | 358/296 |
| 4,897,831 | 1/1990 | Negi et al. | 370/29 |
| 4,901,343 | 2/1990 | Yamaguchi | 358/400 |
| 4,931,955 | 6/1990 | Okabayashi et al. | 346/140 R X |
| 4,956,723 | 9/1990 | Toda | 358/400 X |
| 4,963,884 | 10/1990 | Kiguchi et al. | 346/1.1 |

FOREIGN PATENT DOCUMENTS

| | | |
|---|---|---|
| 58-119867 | 7/1983 | Japan . |
| 58-183265 | 10/1983 | Japan . |

*Primary Examiner*—Benjamin R. Fuller
*Assistant Examiner*—Alrick Bobb
*Attorney, Agent, or Firm*—Fitzpatrick, Cella, Harper & Scinto

[57] ABSTRACT

An image communication apparatus includes a communication unit for communicating a procedure signal associated with communication, and image data, a recording unit for ejecting a liquid droplet to a recording member in accordance with image data received by the communication unit, a recovery unit for performing a predetermined recovery operation of the recording unit, and a control unit for, when reception is successively performed immediately after completion of transmission by the communication unit, driving the recovery unit in accordance with a predetermined procedure signal.

8 Claims, 4 Drawing Sheets

IMAGE COMMUNICATION APPARATUS

BACKGROUND OF THE INVENTION

The present invention relates to an image communication apparatus for injecting a liquid droplet onto a recording member to perform image recording.

In general, a so-called ink-jet recording system (also sometimes referred to herein as "ejecting") a droplet of a liquid such as an ink onto a record sheet according to recording information to perform image recording is known.

This type of ink-jet recording system has the following drawbacks.

(1) The ink-jet recording system often causes a printing error due to evaporation or drying of ink or clogging of nozzles with dust, and in a non-recording state, a preservation operation for the recording head, such as capping, is necessary.

(2) In order to suppress such a printing error, head recovery operations such as idle injection of all the nozzles, an ink supply operation, and the like must be performed before printing, and a considerable time is required until recording is ready.

(3) When a head has a large number of nozzles, in particular, in a line head, a probability of omission of printing dots is increased.

Such drawbacks become more serious as the number of nozzles of the head is increased, and pose serious problems particularly when the ink-jet recording system is applied to an apparatus which has a relatively long standby time without recording, e.g., an image communication apparatus such as a facsimile.

Therefore, an ink-jet image communication apparatus comprising a recording head having a plurality of nozzles has not been realized yet.

SUMMARY OF THE INVENTION

The present invention has been made in consideration of the above situation, and has as its object to improve an image communication apparatus for injecting a liquid droplet onto a recording member to record an image.

It is another object of the present invention to provide an image communication apparatus which can prevent a printing error.

It is still another object of the present invention to provide an image communication apparatus which can efficiently perform a reception operation.

It is still another object of the present invention to provide an image communication apparatus which can shorten a time until a recording operation is started when reception is performed after completion of transmission.

It is still another object of the present invention to provide an image communication apparatus which can quickly perform recovery processing of a recording head when reception is performed after completion of transmission.

It is still another object of the present invention to provide an image communication apparatus which performs standby operations including recovery processing of a recording head in response to transmission of a predetermined procedure signal, thereby shortening a time until reception is started when reception is performed immediately after completion of transmission.

The above and other objects will be apparent from the accompanying drawings and the following description of the preferred embodiment.

BRIEF DESCRIPTION OF THE PREFERRED EMBODIMENTS

FIG. 2-1 is a sectional view of an ink-jet recording apparatus of this embodiment;

Figures 1, 2:
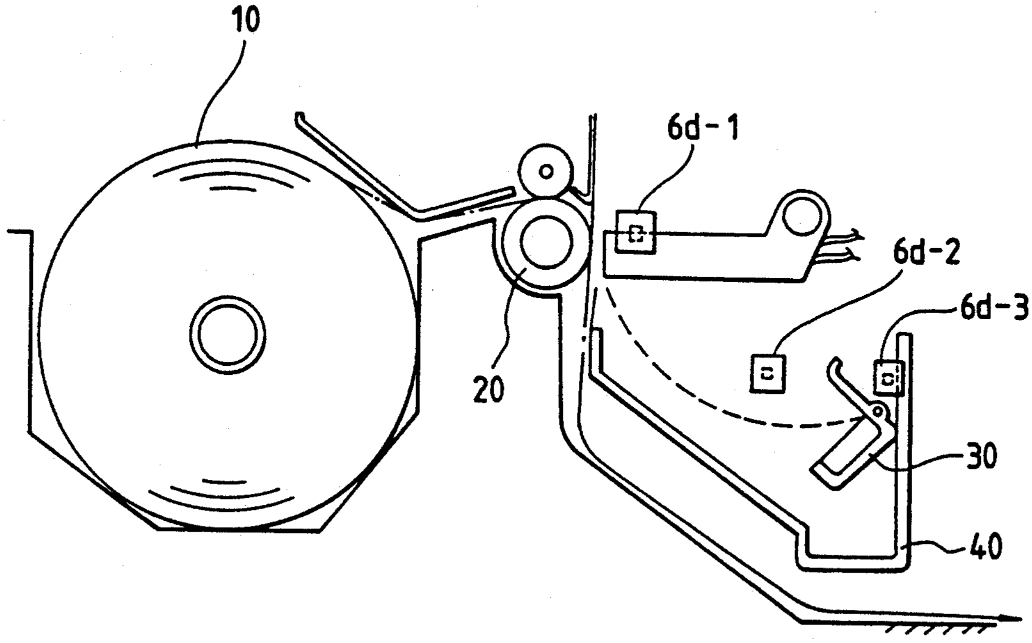
Figure 2:
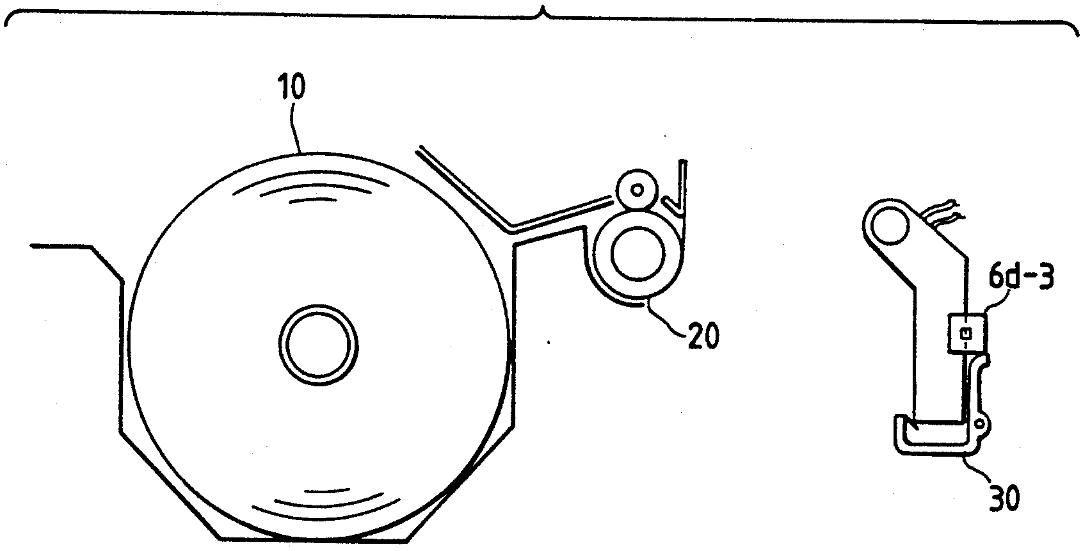
Figure 3:
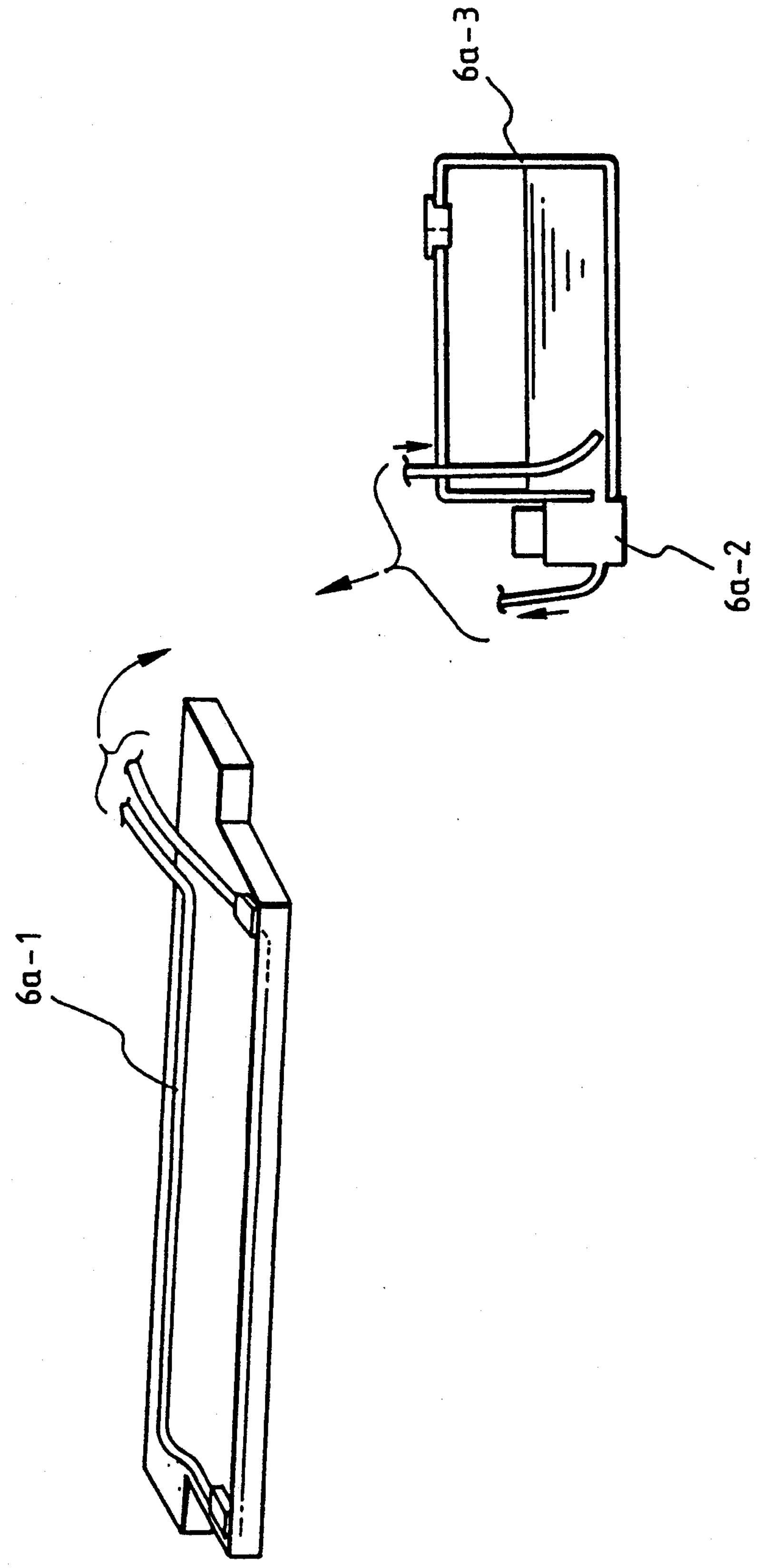
Figure 4:
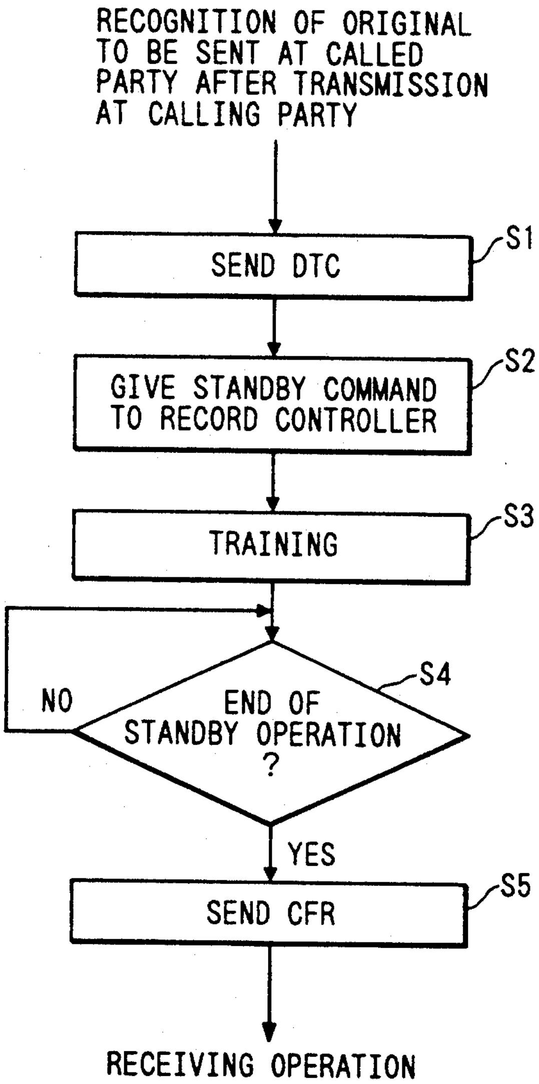

FIG. 2—2 is a sectional view showing a preservation position of a recording head;

FIG. 3 is a view showing an ink-jet recording head used in this embodiment;

FIG. 4 is a flow chart of a main controller of this embodiment; and

Figure 5:
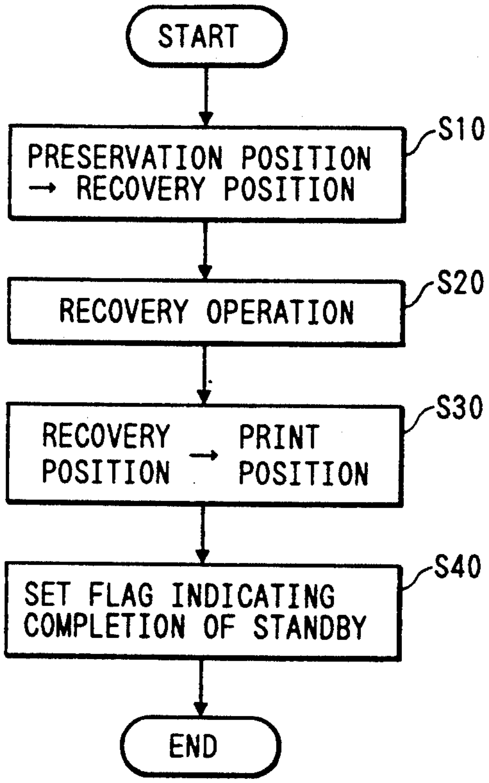

FIG. 5 is a flow chart of a record controller of this embodiment.

DETAILED DESCRIPTION OF THE PREFERRED EMBODIMENT

An embodiment of the present invention will be described in detail hereinafter.

A facsimile apparatus exemplified as an embodiment of the present invention has an ink-jet full-line type line head having a length corresponding to a width of a maximum record sheet which can be used in recording, a head preservation means which can prevent evaporation and clogging of an ink by, e.g., capping, a head recovery means for performing idle injection of all the nozzles of the line head or ink supply to prevent a printing error, and means for shifting a head to one of a preservation position, a recovery position, and a print position for performing recording, so that the recording head is moved from the preservation position to the print position via a predetermined standby operation simultaneously with transmission of a DTC (digital transmission command) signal when reception is successively performed immediately after completion of transmission.

Figure 1:
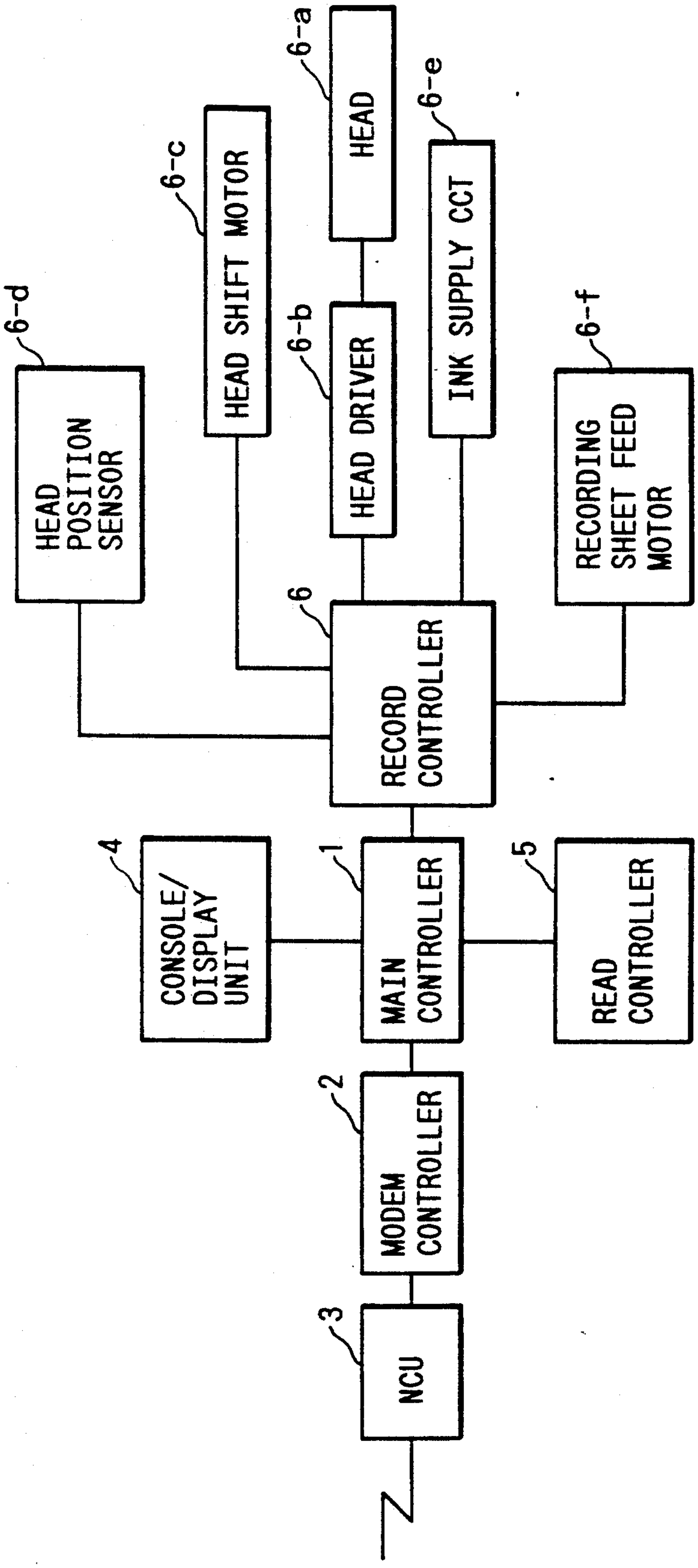
FIG. 1 is a block diagram showing an electrical arrangement of a facsimile apparatus according to an embodiment of the present invention.

FIG. 1 is a block diagram showing an embodiment of a facsimile apparatus to which the present invention is applied. In FIG. 1, a main controller 1 of the facsimile apparatus controls facsimile operations such as reading, recording, communication, and the like. A modem controller 2 is connected to a line through an NCU 3. A console/display unit 4 comprises LCDs or LEDs and key switches. A read controller 5 has CCDs or a contact sensor. A record controller 6 performs recording of an image read by the read controller 5 or an image received by the modem controller 2. The record controller 6 performs printing of data transferred to a head 6-a by energizing a head driver 6-b. A head shift motor 6-c shifts the head to one of the preservation, recovery, and print positions, and a head position sensor 6-d detects the position of the head. An ink supply circuit 6-e supplies an ink to the line head. The ink supply circuit 6-e performs an ink supply operation after an ink cartridge is exchanged or during a head recovery operation. A recording sheet feed motor 6-f feeds a record sheet for each one-line printing operation.

FIG. 2-1 is a cross-sectional view of an ink-jet recording apparatus mounted on the facsimile apparatus shown in FIG. 1. The recording apparatus shown in FIG. 2-1 includes a record sheet 10, a platen roller 20 for feeding the record sheet, an ink-jet head preservation cap 30, and an exhaust ink tray 40. The apparatus also includes a head print position sensor 6d-1, a recovery position sensor 6d-2, and a preservation position sensor 6d-3.

FIG. 2-2 is a view showing a state wherein the head is located at the preservation position. In this state, the nozzle surface is capped by the preservation cap 30.

FIG. 3 shows the full-multi ink-jet head used in this embodiment. In this head, nozzles of one line corresponding to the width of a maximum record size are aligned. In this case, head piping paths behind the nozzle array are not shown. The head shown in FIG. 3 has an ink supply pipe 6a-1. An ink is supplied from an ink tank by driving a gear pump.

The ink-jet head of this embodiment is of a bubble-jet type. In this head, an electro-thermal conversion element such as a heater is driven according to recording information to generate bubbles, thereby injecting an ink.

Stop positions and operations of the head will be described below.

When the sensor 6d-1 shown in FIG. 2-1 is turned on, the head is located at the print position, and the head driver 6-b is turned on to perform recording. When the sensor 6d-2 is turned on, the head is located at the recovery position, and causes the ink supply circuit 6-e to perform an ink supply operation to recover a printing error caused by clogging of nozzles or evaporation of an ink or causes the head driver 6-b to perform an idle injection operation with all black image information. Thus, an ink is forcibly injected from injection ports to remove an ink having increased viscosity in the nozzles. The removed ink is received by the exhaust ink tray 40. Furthermore, when the sensor 6d-3 is turned on, the head is located at the preservation position, and capping for preventing evaporation and clogging of an ink in a head non-use state is performed.

A gear pump 6a-2 shown in FIG. 3 supplies an ink from an ink cartridge 6a-3 to the head. The ink supply circuit 6-e shown in FIG. 1 is operated to drive this pump, thereby supplying an ink.

The recovery operation includes two kinds of operations, i.e., (1) a method of driving the pump to supply an ink, and (2) an idle injection method of transferring all black data corresponding to one line of the head to the head, and turning on the head driver 6-b (FIG. 1) to perform a normal all black printing operation at the recovery position.

FIG. 4 is a flow chart showing an operation of the main controller 1, and FIG. 5 is a flow chart showing an operation of the record controller 6.

The overall operation of the facsimile apparatus of this embodiment will be described below with reference to the flow charts of FIGS. 4 and 5.

FIG. 4 is a flow chart of the main controller when polling is successively started immediately after completion of transmission. In step S1, a DTC (digital transmission command) signal is sent to a transmitting station. DTC is a signal for instructing a station on the other end of a line to transmit image data when the own apparatus receives a signal DIS (digital identification signal) for informing functions of the station on the other end of a line and detects the presence of an original after completion of transmission. Thereafter, since the own apparatus becomes a receiving station, DTC has the same information as the DIS. Upon reception of the DTC, the station on the other end of the line sends a signal DCS for instructing a reception mode, and a signal TCF for checking if there is a transmission error before image data is transmitted.

In step S2, a head standby command is given to the own record controller 6, and training for reception is performed in step S3. In step S4, head standby end information from the record controller 6 is awaited. In step S5, a CFR (check for reception ready) signal is sent, and an image data reception operation is then started. Note that CFR is a signal for informing that the receiving station is ready to receive the image data.

FIG. 5 is a flow chart of the record controller 6 which has received the head standby command output from the main controller 1 in step S2. In step S10, the head is shifted from the preservation position to the recovery position. After the position of the head is checked by the sensor, an ink supply or ink idle injection operation is performed in step S20.

In step S30, the head is shifted from the recovery position to the print position. In some cases, a wiping operation for removing an ink attached to nozzle ports is required. When the print position sensor of the head is turned on, completion of a standby operation is informed to the main controller in Step S40.

In the above embodiment, the head standby operation is performed by the record controller 6. However, these control operations may be performed by the main controller.

In the above embodiment, the head standby operation is performed simultaneously with transmission of the DTC after completion of transmission. However, as soon as it is confirmed upon reception of a DIS (digital identification signal) from a station on the other end of the line after completion of transmission that the station on the other end of the line has a transmission original, the standby operation may be started. Furthermore, when it is detected in response to a DIS after calling that a station on the other end of the line has a transmission original, the standby operation can be similarly performed.

As described above, when reception is successively performed immediately after completion of transmission, the head standby operation is started in response to transmission of a digital transmission command signal. Thus, reception can be efficiently performed even when a preservation or recovery operation is required like in an ink-jet system.

In this embodiment, a recording operation is performed by a bubble-jet system. Any other systems may be employed, as a matter of course.

The recording head is not limited to a full-multi type recording head. For example, a head which serially scans a recording member to perform image recording may be employed.

In this embodiment, the standby operation including the recovery operation is performed in synchronism with transmission of the DTC signal. However, the present invention is not limited to this. For example, the standby operation may be started in synchronism with reception of a DCS or TCF or transmission of a CFR signal.

What is claimed is:

1. An image communicating apparatus comprising:

communication means for communicating with a transmitting apparatus to send and receive procedure signals associated with communication of image data, wherein said communication means to a reception mode upon receiving a procedure signal indicating a presence of an original sheet to be transmitted from a partner station after calling the partner station;

recording means for ejecting an ink droplet onto a recording member to record an image in accordance with the image data received by said communication means;

recovery means for performing a predetermined recovery operation of said recording means to maintain image quality; and control means for causing said recovery means to execute the predetermined recovery operation in accordance with a specific procedure signal transmitted to or receiving from the partner station before receiving image data, when said communication means shifts to the reception mode after the calling of the partner station.

2. An image communicating apparatus comprising:

communication means for communicating with a transmitting apparatus to send and receive procedure signals associated with communication of image data, wherein said communication means assumes a receiving mode for accepting transmitted image data, and sends a transmitted procedure signal to the transmitting apparatus indicating that said communicating means is in the receiving mode, when the image communicating apparatus receives a procedure signal from the transmitting apparatus indicating a presence at the transmitting apparatus of image data to be sent;

recording means for ejecting an ink droplet onto a recording member to record an image in accordance with the image data received by said communication means;

recovery means for performing a predetermined recovery operation of said recording means to maintain image quality; and control means for initiating operation of said recovery means in response to the transmitted procedure signal; wherein said control means initiates operation of said recovery means in synchronism with transmission of the transmitted procedure signal.

3. An apparatus according to claim 1 or 2, wherein the transmitted procedure signal instructs the transmitting apparatus to transmit image data.

4. An apparatus according to claim 1 or 2, wherein said control means causes said communication means to transmit to the transmitting apparatus a procedure signal indicating an image data a reception standby operation after the recovery operation is completed.

5. An apparatus according to claim 1, wherein said recovery means performs a recovery operation that supplies ink to said recording means.

6. An apparatus according to claim 1, wherein said recovery means performs a recovery operation tat causes said recording means to perform an idle ejection operation not intended for recording.

7. An apparatus according to claim 1 or 2, wherein said recording means has nozzles of one line corresponding to a maximum width of a recording member which can be used in recording.

8. An apparatus according to any one of claims 1, 2, 5 and 6, wherein said recording means comprises a plurality of nozzles and a plurality of electro-thermal conversion elements arranged in correspondence with the nozzles, said electro-thermal conversion elements being driven according to the image data to generate bubbles by heat generated by said electrothermal conversion elements, thereby ejecting ink.

* * * * *

UNITED STATES PATENT AND TRADEMARK OFFICE

CERTIFICATE OF CORRECTION

PATENT NO. : 5,229,792

DATED : July 20, 1993

INVENTOR(S) : TAKESHI ONO, ET AL.

It is certified that error appears in the above-identified patent and that said Letters Patent is hereby corrected as shown below:

COLUMN 1

Line 8, "system (also" should read --system for injecting (also--.

COLUMN 4

Line 66, "to" should read --shifts to--.

COLUMN 5

Line 14, "receiving" should read --received--.

COLUMN 6

Line 15, "a" should be deleted.
Line 21, "tat" should read --that--.
Line 34, "electrothermal" should read --electro-thermal--.

Signed and Sealed this

Fifteenth Day of March, 1994

Attest:

Bruce Lehman

BRUCE LEHMAN

*Attesting Officer* *Commissioner of Patents and Trademarks*

--